(12) United States Patent
Sparks et al.

(10) Patent No.: US 6,625,340 B1
(45) Date of Patent: Sep. 23, 2003

(54) OPTICAL SWITCH ATTENUATOR

(75) Inventors: Adrian P Sparks, Ongar (GB); Robert Spagnoletti, Hertfordshire (GB); Gordon D Henshall, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/474,544

(22) Filed: Dec. 29, 1999

(51) Int. Cl.[7] ............................... G02B 6/26; G02B 6/42

(52) U.S. Cl. ............................................ 385/18; 398/45
(58) Field of Search ................................. 359/117, 128; 385/16–18

(56) References Cited

U.S. PATENT DOCUMENTS

| | | | | |
|---|---|---|---|---|
| 6,031,946 A | * | 2/2000 | Bergmann et al. | 385/18 |
| 6,256,430 B1 | * | 7/2001 | Jin et al. | 385/18 |
| 6,424,757 B1 | * | 7/2002 | Sparks et al. | 385/16 |
| 2002/0168131 A1 | * | 11/2002 | Walter et al. | 385/16 |

* cited by examiner

*Primary Examiner*—Kinfe-Michael Negash
(74) *Attorney, Agent, or Firm*—Barnes & Thornburg

(57) ABSTRACT

An optical switch comprising switching means arranged to switch an optical signal by redirection of the optical beam path of said signal, wherein said optical switch is arranged to misalign the optical beam path so as to provide a predetermined optical output power. Thus a switch can be directly used to attenuate a signal, instead of utilising separate attenuators.

12 Claims, 4 Drawing Sheets

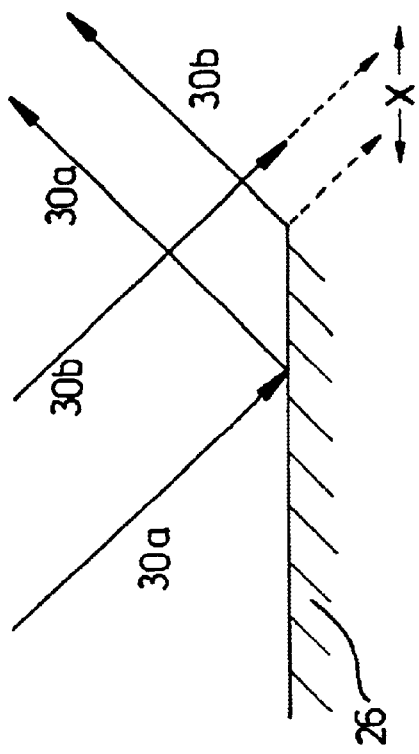
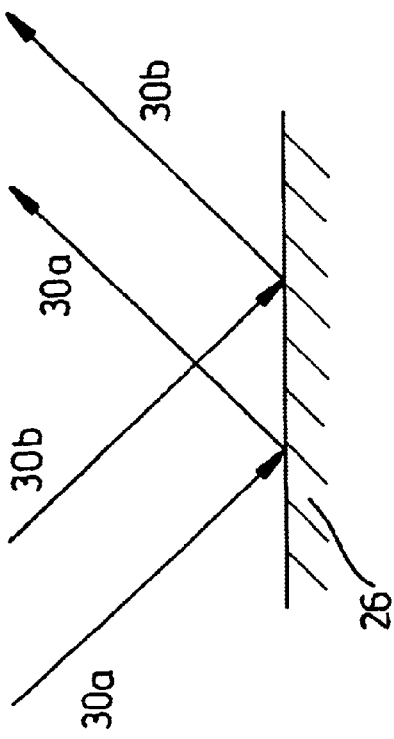
Fig. 3a
Fig. 3b

OPTICAL SWITCH ATTENUATOR

FIELD OF THE INVENTION

The invention relates to a optical switch, and in particular to an optical switch and a method of controlling an optical switch for attenuation of an optical signal.

BACKGROUND OF THE INVENTION

The control of optical power levels in optical communications systems is critical in obtaining optimum performance. The power level needs to be sufficient to establish a signal to noise ratio which will provide an acceptable bit error rate but without the power level exceeding a level at which limiting factors (e.g. the onset of non-linear effects) result in degradation of the signal or other co-propagating signals.

In wavelength division multiplexed (WDM) transmission, it is desirable to control the power of the individual optical channels or wavelengths. Channels could be controlled to provide constant system signal to noise ratio. One of the simplest methods of control is to maintain each of the power levels of the individual wavelength components (channels) at substantially the same level.

Alternate schemes provide different power levels for each channel, e.g. lower bit rate signals and/or signals propagating over a relatively short distance may be transmitted at lower powers.

The network components that the optical multiplex signal passes through typically have attenuation or amplification characteristics which vary with wavelength. In particular, optical amplifiers may not have a flat gain profile, providing different amounts of gain on different wavelengths. As an optical multiplex signal may pass through many amplifiers before the signal is regenerated, even small variations in gain flatness can produce large differences in the relative amplitudes of the individual optical channels.

It is also possible that wavelengths from different sources need to be placed in the same multiplex. An optical network may use optical time division multiplexing to compliment the wave division multiplexing functionality, routing different wavelength packets on different channels to different destinations. Consequently, optical signal packets or wavelengths from different sources may share common routes, and in order to ensure optimal transmission along those routes relatively frequent channel power equalisation may be necessary. If the paths traversed by the wavelengths through the network are different then even if the wavelengths started with the same amplitude at their respective origins, the amplitudes may be very different at the point they are placed on the same multiplex. If a channel is of much lower power than the adjacent channels interference from these channels due to fibre non-linearity will have a greater effect than if the channels had approximately equal powers.

It is therefore desirable to provide variable attenuators in communications system to allow the control of optical signal powers.

Variable optical attenuator systems are well-known in the telecommunications field. For instance, U.S. Pat. No. 5,956,437 describes an electrically controlled optical attenuator. The attenuator is formed by a mach-zehnder waveguide configuration with a variable refractive index element in one arm to modify the spectral characteristics of network to give a specific attenuation at a specific wavelength. Co-pending U.S. application Ser. No. 09/361,950 describes a method and apparatus for determining control signals of a filter for optimisation (i.e. attenuation) of the gain profile of an optical amplifier, and indicates how equalisation of an optical signal profile may be made over a relatively broad spectral range.

All of these instances require at least one attenuator/filter element to be incorporated into the system. If a range of channels need to be equalised (i.e. ensure that an approximately equal power is within each optical channel) then due to the roll off of the profiles of normal filters, it can be necessary to demultiplex a WDM system, equalise each channel individually using a separate attenuator, and then remultiplex the system. This significantly increases the component count and cost of any equalisation system.

The present invention aims to address such problems.

SUMMARY OF THE INVENTION

In one aspect, the present invention provides a method of controlling an optical switch comprising switching means arranged to switch an optical signal by redirection of the optical beam path of said signal, the method comprising controlled misalignment of the optical beam path so as to achieve a predetermined optical output power.

By controlling the misalignment of the optical beam path through the switch, the optical signal can be attenuated in a controlled manner. Utilising an optical switch in this format alleviates the requirement for separate optical attenuators to be incorporated into the system. If the optical system is being used as part of a WDM system, it is typical for the signal to be demultiplexed into the separate optical channels prior to input to the switch. If desired, each of the channels passing through the switch may be attenuated to whatever degree necessary to achieve the desired effect, e.g. equalisation of optical power across all channels. If the signal is demultiplexed into groups of channels, equalisation of power could also be applied to these groups of wavelengths.

If desired, normal operation of the switch could be performed with each of the signals attenuated by misalignment, thus permitting the optical power of any one or more signals to be increased by improving the beam alignment to the degree required to obtain the desired power.

Preferably, the method further comprises the steps of measuring the power of an optical signal; and controlling said switching means to misalign said optical beam path and achieve said predetermined output power.

Preferably, said step of measuring the optical signal power comprises at least one of measuring the input optical signal power and measuring the output optical signal power.

If the optical switch is calibrated such that a predetermined misalignment produces a predetermined attenuation, then only a single indication of the optical signal power is necessary. If desired, such a power measurement could be performed substantially upstream or downstream of the optical switch, at a different point within the network if the attenuation characteristics of any intervening components are known. Alternatively, both the input and the output optical signal to the switch could be measured in order to directly indicate the degree of the attenuation of the optical signal as it passes through the switch. This information could be used to provide a closed loop feedback control system to ensure that the desired degree of attenuation is achieved for each optical signal (or channel).

Preferably, the optical switch comprises at least two inputs and two outputs, and said measurement step comprises determining the relative ratios between the optical powers of at least any two optical signals.

Preferably, said optical switch comprises at least two inputs and two outputs arranged to switch the optical beam path of different wavelength optical signals, the method comprising misaligning respective optical beam paths so as to achieve a predetermined ratio of output optical power between at least any two of said different wavelength optical signals.

Preferably, said predetermined ratio is substantially unity. Hence, channel equalisation is achieved.

Preferably, said redirection of the optical beam path is achieved by reflection, refraction and/or diffraction.

In another aspect, the present invention provides a computer program on a machine-readable medium, said computer program being capable of performing a method of controlling an optical switch comprising switching means arranged to switch an optical signal by redirection of the optical beam path of said signal, the method comprising controlled misalignment of the optical beam path so as to achieve a predetermined optical output power.

In a further aspect, the present invention provides an optical switch comprising switching means arranged to switch an optical signal by redirection of the optical beam path of said signal, wherein said optical switch is arranged to misalign an optical beam path so as to provide a predetermined optical output power.

Preferably, the switch further comprises control means capable of receiving an input signal indicative of the power of an optical signal, the control means being arranged to control the functioning of said switching means for achieving misalignment of said optical beam path.

Preferably, the switch further comprises power measuring means arranged to provide a signal indicative of the power of an optical signal.

In another aspect, the present invention provides a telecommunications system comprising an optical switch comprising switching means arranged to switch an optical signal by redirection of the optical beam path of said signal, wherein said optical switch is arranged to misalign the optical beam path so as to provide a predetermined optical output power.

The preferred features may be combined as appropriate, as would be apparent to a skilled person, and may be combined with any aspects of the invention.

BRIEF DESCRIPTION OF THE DRAWINGS

In order to show how the invention may be carried into effect, embodiments of the invention are now described below by way of example only and with reference to the accompanying figures in which:

FIGS. 3a and 3b illustrate respectively how the beam may be reflected from a mirror in normal operation and in accordance with another embodiment of the present invention.

DETAILED DESCRIPTION OF PREFERRED EMBODIMENTS

Many telecommunications networks are moving in the direction of all optical networks, incorporating optical switching. "Performance of a 576×576 optical cross connect" H Laor, A Richards, E Fontenot, Proceedings of the National Fibre Optic Engineers Conference Sep. 28$^{th}$, 1999, Chicago, USA, incorporated herein by reference, describes a recently developed optical switch. As is common with many such optical switches, it is fabricated using microelectro-mechanical systems (MEMS) technology. It may be used to switch WDM signals as a group, or the WDM signals may be demultiplexed outside the switch and switched individually or as groups of channels if desired.

Figure 1:
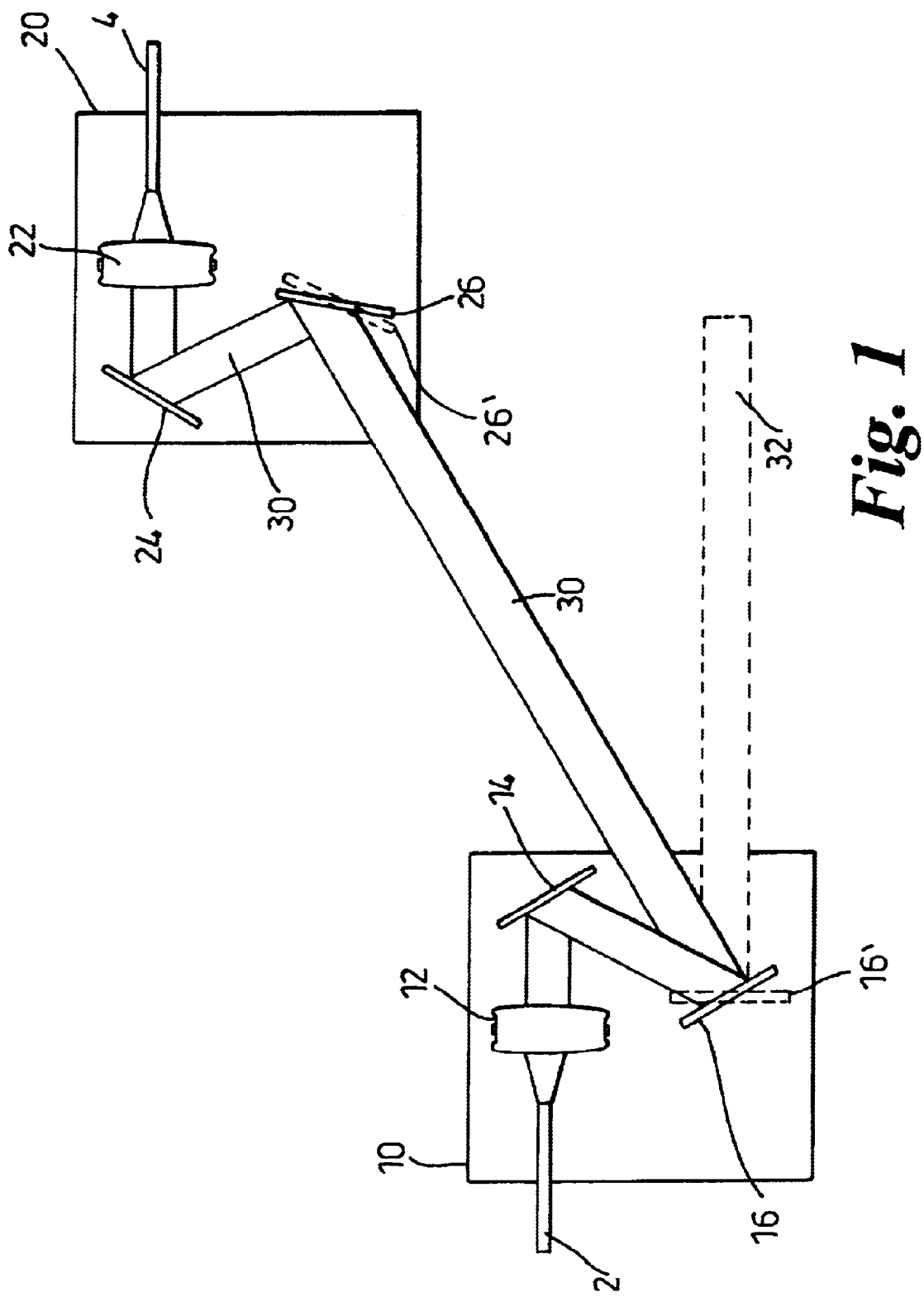
FIG. 1 illustrates a schematic diagram of an optical path through two modules in an optical cross-connect (OXC) switch (PRIOR ART)

This particular optical switch is constructed of a number of modules or units. FIG. 1 shows the optical path which represents a connection between the two modules 10, 20. Light from a fibre 2 passes through a focussing lens 12. The light which forms the beam is reflected off a fixed mirror 14 to keep device packaging small. It is then reflected off a movable mirror 16 which precisely directs the beam in two axes. If the movable mirror is in position 16', the beam will move along an alternative path shown as 32.

To make an optical connection between modules 10,20, the movable mirror 16 directs the beam at the movable mirror 26 of a targeted second module 20. At the same time the movable mirror 26 of the second module 20 is controlled to deflect the beam 30 towards the fixed mirror 24, into the lens 22 and hence into the fibre 4 completing the connection. It is the co-ordinated control of deflection angles by the two movable mirrors 16,26 that creates the optical connection between two transmission fibres 2,4.

By having two arrays of such modules, optical signals coming in from a first array may be directed into any of the output fibres of the second array. It should also be noted that the terms input and output are used for convenience, the optical path through any two modules in a connection being bi-directional.

In normal operation a closed-loop servo control system is employed. This control system is normally used to provide high optical coupling efficiency between the fibres and to protect the optical signal against vibration and drift. The system operates by controlling the movable micromirrors (16,26), which are fabricated using MEMS technology and are capable of two axis movement, to carefully align the beams so as to ensure that the maximum possible input optical signal is received at the output of the switch.

The present invention utilises a control system to control the mirrors so as to deliberately misalign the optical beam path 30 through the switch. By non-optimally aligning the optical beam path, the optical beam will be attenuated as it passes through the switch due to a reduction in the power of the beam coupled into the output fibre. This permits the switch to be utilised to achieve any desired optical beam power output less than the maximum. Consequently, if desired, WDM system channels may be equalised. Such attenuation is achieved without incorporating separate attenuator(s) within the system.

Figure 4:
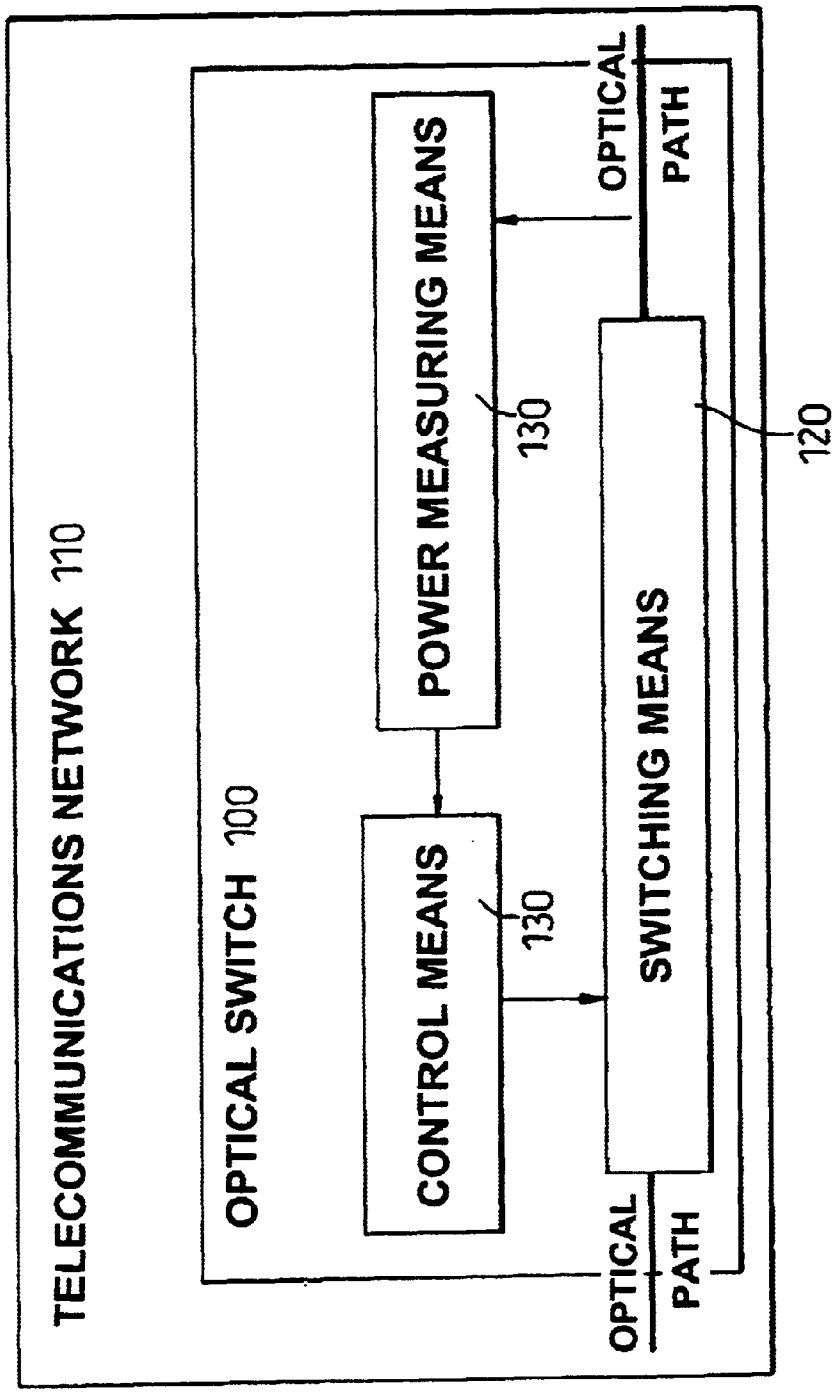
FIG. 4 shows an embodiment of a switch in a telecommunications network.

FIG. 4 shows an optical switch 100 as part of a telecommunications network 110, the switch having an optical path, a switching means 120 a control means 130 capable of receiving an input signal indicative of the power of an optical signal, and being arranged to control the functioning of said switching means for achieving misalignment of said optical beam path. A power measuring means 140 is arranged to provide a signal indicative of the power of the optical signal to the switching means.

Figure 2A:
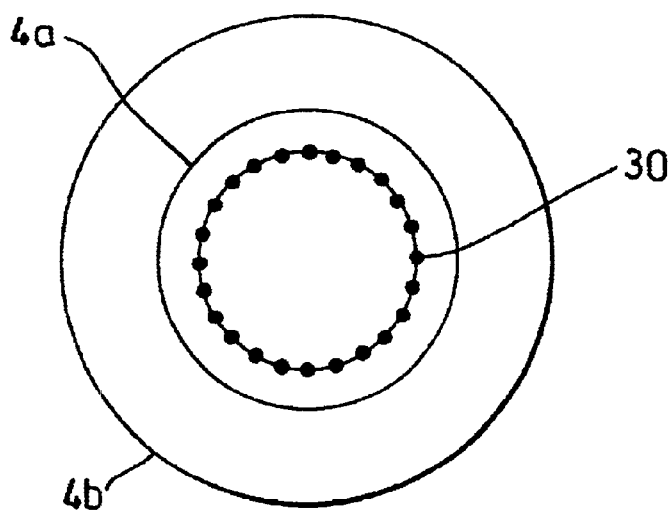
FIGS. 2a and 2b illustrate respectively the manner in which the optical beam is coupled into the output fibre in normal operation and according to an embodiment of the present invention.
Figure 2B:
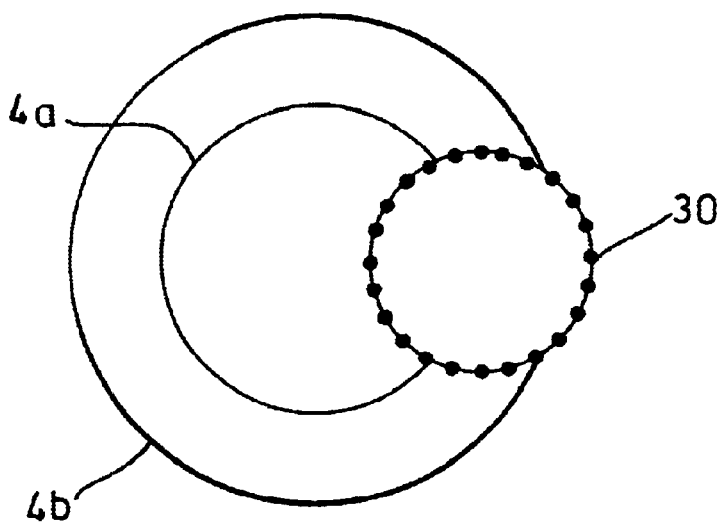

FIG. 2a illustrates how the optical beam 30 would normally be coupled into the optical fiber core 4a, which is surrounded by optical fibre cladding 4b, by the focussing lens 22. If, in accordance with an embodiment of the present invention, the optical beam path is misaligned, e.g. either to misalignment of one of the mirrors 16, 26 or movement of the lens 22, then FIG. 2b illustrates how only a portion of the beam 30 will be coupled into the optical fibre core 4a. Consequently, only the fraction of the beam profile 30 coupled into the output forms the output signal, and hence the optical signal is attenuated.

FIG. 3a shows how the beam 30 is reflected from a mirror (in this example mirror 26) during normal operation. The lines 30a and 30b represent the two extremes of the beam width, with the arrows indicating the beam direction. FIG. 3b shows how such a beam could be attenuated according to another embodiment of the present invention, whereby the incoming beam is misaligned so that only part of the beam profile is reflected from the mirror (and hence subsequently coupled into the output fiber 4). The dotted arrows represent the extremes of the profile of width X of the beam that is lost from the signal due to the misalignment of the beam on the reflective surface of mirror 26. Absorbent material may surround 26, or be placed elsewhere in the switch for prevention of interference by the signal X with other signals.

Whilst the preferred embodiment has been described as utilising a reflective surface (the mirrors) to misalign the optical beam path, it will of course be appreciated that by controlling the position and/or orientation of a refractive unit (e.g. a focussing lens within a switch), the beam path may be similarly misaligned by misaligning the lens in a controllable manner, a desired optical output power less than maximum (i.e. the optical output power if the optical path is perfectly aligned) can be achieved.

Equally, if the switch is of a diffraction type, such as might be achieved by an LC (liquid crystal) providing a controllable diffraction grating, or of a different reflective type (e.g. use of MEMS pop-up mirrors to act as a switch), by controlling the switching media to misalign the optical beam path(s), optical attenuation can be similarly achieved. An example of such a MEMS pop-up mirror is disclosed in "Free-Space Micromachined Optical Switches for Optical Networking", F Y Lin, E L Goldstein and R W Tkach, IEEE Journal of Selected Topics in Quantum Electronics, Vol. 5, No. 1, January/February 1999.

For the purposes of this specification, the terms "optical" and "light" should be understood as pertaining not only to the visible part of the electromagnetic spectrum, but also to the infra-red and ultra-violet parts that bound the visible part.

Any range or device given herein may be extended or altered without losing the effect sought, as will be apparent to a skilled person from an understanding of the teaching herein. For instance, whilst the preferred embodiment of the present invention has been described in conjunction with a specific type of optical switch, it will of course be appreciated that the invention may equally be applied to any optical switch utilising any one or more of reflection, refraction and/or diffraction, in which the optical beam path through the switch can be misaligned so as to attenuate the resultant output signal.

What is claimed is:

1. A method of controlling an optical switch comprising switching means arranged to switch an optical signal by redirection of the optical beam path of said signal, the method comprising the steps of:

measuring the power of an optical signal; and controlling said switching means to misalign the optical beam path so as to achieve a predetermined optical output power.

2. A method as claimed in claim 1, wherein said step of measuring the optical signal power comprises at least one of measuring the input optical signal power and measuring the output optical signal power.

3. A method as claimed in claim 1, wherein the optical switch comprises at least two inputs and two outputs, and said measurement step comprises determining the relative ratios between the optical powers of at least any two optical signals.

4. A method as claimed in claim 1, wherein said optical switch comprises at least two inputs and two outputs arranged to switch the optical beam path of different wavelength optical signals, the method comprising misaligning respective optical beam paths so as to achieve a predetermined ratio of output optical power between at least any two of said different wavelength optical signals.

5. A method as claimed in claim 4, wherein said predetermined ratio is substantially unity.

6. A method as claimed in claim 1, wherein said redirection of the optical beam path is achieved by at least one of reflection, refraction or diffraction.

7. A computer program on a machine-readable medium, said computer program being arranged to carry out the method of claim 1.

8. An optical switch comprising switching means arranged to switch an optical signal by redirection of the optical beam path of said signal, wherein said optical switch is arranged to misalign the optical beam path so as to provide a predetermined optical output power and further comprises control means capable of receiving an input signal indicative of the power of an optical signal, the control means being arranged to control the functioning of said switching means for achieving misalignment of said optical beam path.

9. A switch as claimed in claim 8, further comprising power measuring means arranged to provide a signal indicative of the power of an optical signal.

10. A telecommunications system comprising an optical switch according to claim 8.

11. The switch as claimed in claim 8, having at least two inputs and two outputs, and the input signal having a relative ratio between the optical powers of at least any two optical signals.

12. The switch as claimed in claim 8, having at least two inputs and two outputs arranged to switch the optical beam path of different wavelength optical signals, the control means being arranged to misalign respective optical beam paths so as to achieve a predetermined ratio of output optical power between at least any two of said different wavelength optical signals.

* * * * *